(12) United States Patent
Oltman et al.

(10) Patent No.: US 9,592,752 B2
(45) Date of Patent: Mar. 14, 2017

(54) ENERGY-DISSIPATION SYSTEM

(71) Applicant: Dorel Juvenile Group, Inc., Foxboro, MA (US)

(72) Inventors: Stephen B Oltman, Hope, IN (US); Rajiv A Menon, Columbus, IN (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/935,868

(22) Filed: Nov. 9, 2015

(65) Prior Publication Data

US 2016/0059749 A1    Mar. 3, 2016

Related U.S. Application Data

(63) Continuation of application No. 13/486,884, filed on Jun. 1, 2012, now Pat. No. 9,221,366.

(60) Provisional application No. 61/492,672, filed on Jun. 2, 2011.

(51) Int. Cl.
*B60N 2/28* (2006.01)
*B60N 2/42* (2006.01)
*B60N 2/48* (2006.01)
*B60N 2/427* (2006.01)

(52) U.S. Cl.
CPC ......... *B60N 2/2884* (2013.01); *B60N 2/4235* (2013.01); *B60N 2/4249* (2013.01); *B60N 2/42709* (2013.01); *B60N 2/4879* (2013.01)

(58) Field of Classification Search
CPC .. B60N 2/2884; B60N 2/4879; B60N 2/4235; B60N 2/4249; B60N 2/42709
USPC .................................................... 297/216.11
See application file for complete search history.

(56) References Cited

U.S. PATENT DOCUMENTS

| | | |
|---|---|---|
| 4,092,751 A | 6/1978 | Burkholder et al. |
| 4,265,484 A | 5/1981 | Stalter |
| 6,386,639 B1 | 5/2002 | McMichael |
| 6,623,075 B2 | 9/2003 | Baloga et al. |
| 7,246,852 B2 | 7/2007 | Balensiefer |
| 7,490,909 B1 | 2/2009 | Haggman et al. |
| 7,699,393 B2 | 4/2010 | Forbes et al. |
| 7,717,520 B2 | 5/2010 | Boren et al. |
| 7,726,734 B2 | 6/2010 | Mahal et al. |
| 7,744,154 B2 | 6/2010 | Marsden et al. |
| 7,850,234 B2 | 12/2010 | Marsden et al. |
| 8,348,337 B2 | 1/2013 | Franck |
| 8,783,776 B1 | 7/2014 | Perkins |
| 2002/0175544 A1 | 11/2002 | Goor |
| 2004/0164529 A1 | 8/2004 | Yoshida |
| 2004/0169406 A1 | 9/2004 | Yoshida |
| 2007/0257542 A1 | 11/2007 | Marshall et al. |
| 2009/0066125 A1 | 3/2009 | Nett et al. |
| 2011/0067183 A1 | 3/2011 | Hawkins |

FOREIGN PATENT DOCUMENTS

WO    2011054063 A1    5/2011

*Primary Examiner* — Anthony D Barfield
(74) *Attorney, Agent, or Firm* — Barnes & Thornburg LLP

(57) ABSTRACT

A child restraint includes a juvenile vehicle seat and an energy-absorption apparatus coupled to the juvenile vehicle seat. The energy-absorption apparatus is configured to absorb external energy associated with an external impact force applied to the energy-absorption apparatus.

15 Claims, 17 Drawing Sheets

ENERGY-DISSIPATION SYSTEM

PRIORITY CLAIM

This application is a continuation of U.S. application Ser. No. 13/486,884, filed Jun. 1, 2012, now U.S. Pat. No. 9,221,366, which claims priority under 35 U.S.C. §119(e) to U.S. Provisional Application Ser. No. 61/492,672, filed Jun. 2, 2011, each of which is expressly incorporated by reference herein.

BACKGROUND

The present disclosure relates to an energy-absorbing apparatus, and in particular, to devices for dissipating energy associated with external impact forces. More particularly, the present disclosure relates to an energy-dissipation system included in a juvenile product such as a child-restraint system.

When exposed to an external impact force, a juvenile vehicle seat at rest on a seat in a car or truck will accelerate as it moves to a new location in the passenger compartment of a car or truck. A child seated in such a moving juvenile vehicle seat will also accelerate as the juvenile vehicle seat moves in the passenger compartment.

A g-load is a measurement of an object's acceleration measured in g's. The g is a non-SI unit equal to the nominal acceleration due to gravity on earth at sea level. A short-term acceleration experienced by a child seated in a juvenile vehicle seat (or any other juvenile seat) that moves suddenly is called a shock and is measured in g's.

SUMMARY

An energy-dissipation system in accordance with the present disclosure is included in an apparatus that is exposed to external impact forces. In an illustrative embodiment, the energy-dissipation system is coupled to a juvenile vehicle seat to provide a child-restraint system.

In illustrative embodiments, the energy-dissipation system includes a first force dissipater configured to provide means for absorbing external energy applied to the juvenile vehicle seat. The force dissipater is coupled to a headrest included in the juvenile vehicle seat.

In illustrative embodiments, the energy-dissipation system includes a second force dissipater. The second force dissipater is coupled to the headrest of the juvenile vehicle seat in spaced-apart relation opposite the first force dissipater to define a space therebetween. The space is configured to receive a head and shoulders of an occupant sitting in the juvenile vehicle seat.

In illustrative embodiments, the first force dissipater includes a ride-down pad and a pad foundation. The pad foundation is configured to provide means for supporting the ride-down pad in spaced-apart relation to the headrest. The ride-down pad is coupled to the pad foundation and arranged to extend away from the headrest toward the second force dissipater. In illustrative embodiments, the ride-down pad includes an array of crush strips, with each crush strip of the ride-down pad including a series of hexagon-shaped structures coupled to one another to establish a crush strip.

In illustrative embodiments, the second force dissipater includes a second ride-down pad and a second pad foundation similar in size, shape, and pattern to the ride-down pad and pad foundation of the first force dissipater. The second ride-down pad includes an array of crush strips similar in size, shape, and pattern to the array of crush strips included in the ride-down pad of the first force dissipater.

In illustrative embodiments, the energy-dissipation system also includes a third force dissipater. The third force dissipater is coupled to the headrest and is arranged to lie in the space between the first and second force dissipaters.

In illustrative embodiments, the third force dissipater includes a third ride-down pad and a third pad foundation. The third pad foundation is configured to provide means for supporting the third ride-down pad in spaced apart relation to the headrest. In illustrative embodiments, the third ride-down pad includes a series of laterally spaced-apart, vertically extending crush strips which cooperate to define the array of crush strips in the third force dissipater. In illustrative embodiments, the width of each crush strip is about equal to the width of the space provided between each pair of adjacent crush strips.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 6A is a front elevation view of the child restraint and showing a child in the juvenile vehicle seat, the child restraint including the energy-dissipation system and the child's head and upper body portion being positioned between the first ride-down pad and the second ride-down pad prior to an impact force (dashed arrow) being applied to the child restraint, the child's head and upper body aligned with and existing along a center-line axis that is generally perpendicular to the seat bottom of the juvenile vehicle seat;

FIG. 6B is a front elevation view of the child restraint of FIG. 6A just after an impact force (solid arrow) has been applied to the child restraint and showing the child's upper body or shoulder has engaged with the first ride-down pad as a result of the impact force being applied to the child restraint in a direction opposite of the movement of the child's upper body, the child's head also moving in a direction toward the first ride-down pad such that both the child's head and body lines are not aligned with the center-line axis;

FIG. 6C is a front elevation view of the child restraint of FIG. 6A at a point in time just after the view in FIG. 6B, showing the impact force (solid arrow) causes the child's head to engage with the first ride-down pad in addition to the child's upper body, the child's head and upper body being angled toward the first ride-down pad with respect to the center-line axis as a result of the impact force and showing the first ride-down pad engages with the child's head at a point closer to the center-line axis than the distance between the center-line axis and the first side-wing panel of the vehicle seat;

FIG. 6D is a front elevation view of the child restraint of FIG. 6A at a point after the impact force is no longer applied to the child restraint and the child restraint is subject to a recoil or deflection force (solid arrow) as the vehicle comes to a stop, the recoil force being in a direction opposite of the direction the child's body and head traveled as a result of the impact force, the recoil force causing the child's head and body to be moved in the direction of the recoil force;

FIG. 6E is a front elevation view of the child restraint of FIG. 6A at a point after the view in FIG. 6D showing the recoil force (solid arrow) has caused the child's body line to shift from angling toward the first side-wing panel to angling toward the second side-wing panel, the child's shoulder engaging with the second ride-down pad as a result of the recoil force being applied in a similar but opposite manner as that of the impact force in FIG. 6B, and showing the child's head line is still slightly angled toward the first side-wing panel;

FIG. 6F is a front elevation view of the child restraint of FIG. 6A at a point just after the view in FIG. 6E, showing the recoil force (solid arrow) causes the child's head line to shift from angling toward the first side-wing panel to angling toward the second side-wing panel, the child's head engaging with the second ride-down pad in addition to the child's upper body portion, the child's head line and body line being again aligned and angled with respect to the center-line axis as a result of the recoil force, and showing the angular distance the child's head line travels from FIG. 6E to FIG. 6F due to the recoil force is less than the angular distance between the child's head line in FIG. 6E and the second side-wing panel of the vehicle seat;

DETAILED DESCRIPTION

Figure 18:
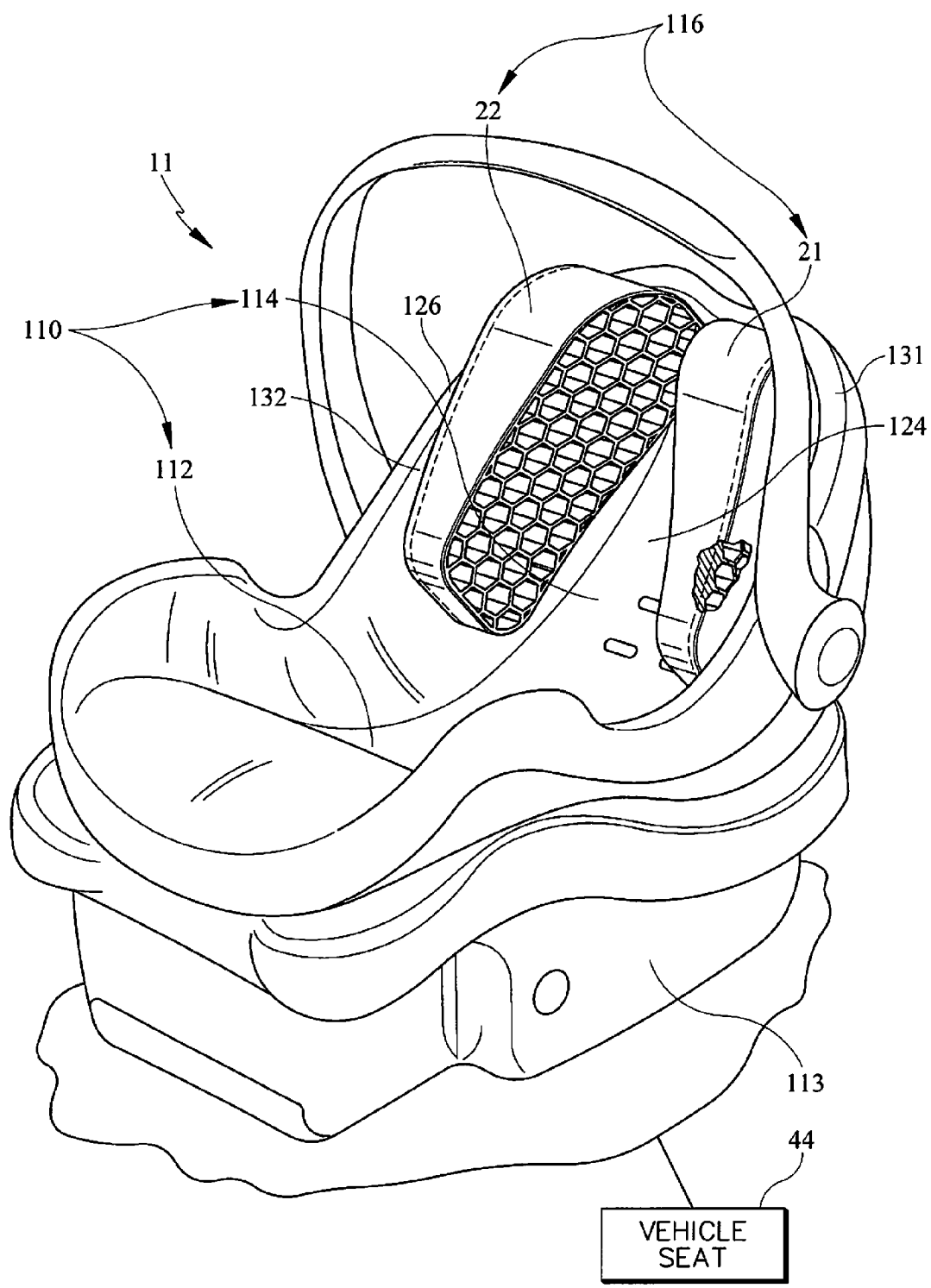
FIG. 18 is a perspective view of a second embodiment of a child restraint including a juvenile vehicle seat for supporting an infant and having a seat bottom and a seat back extending upwardly from the seat bottom, a base adapted to set on an underlying seat in a vehicle and support the juvenile vehicle seat, and an energy-dissipation system in accordance with another embodiment of the present disclosure coupled to the seat back and showing that the seat back comprises a backrest coupled to the seat bottom and a headrest coupled to the backrest and that the energy-dissipation system comprises a first pad foundation mounted on an inner wall of a first side-wing panel included in the headrest and coupled to a first ride-down pad and a second force pad foundation mounted on an inner wall of an opposite, second side-wing panel included in the headrest and coupled to a second ride-down pad.
Figure 19:
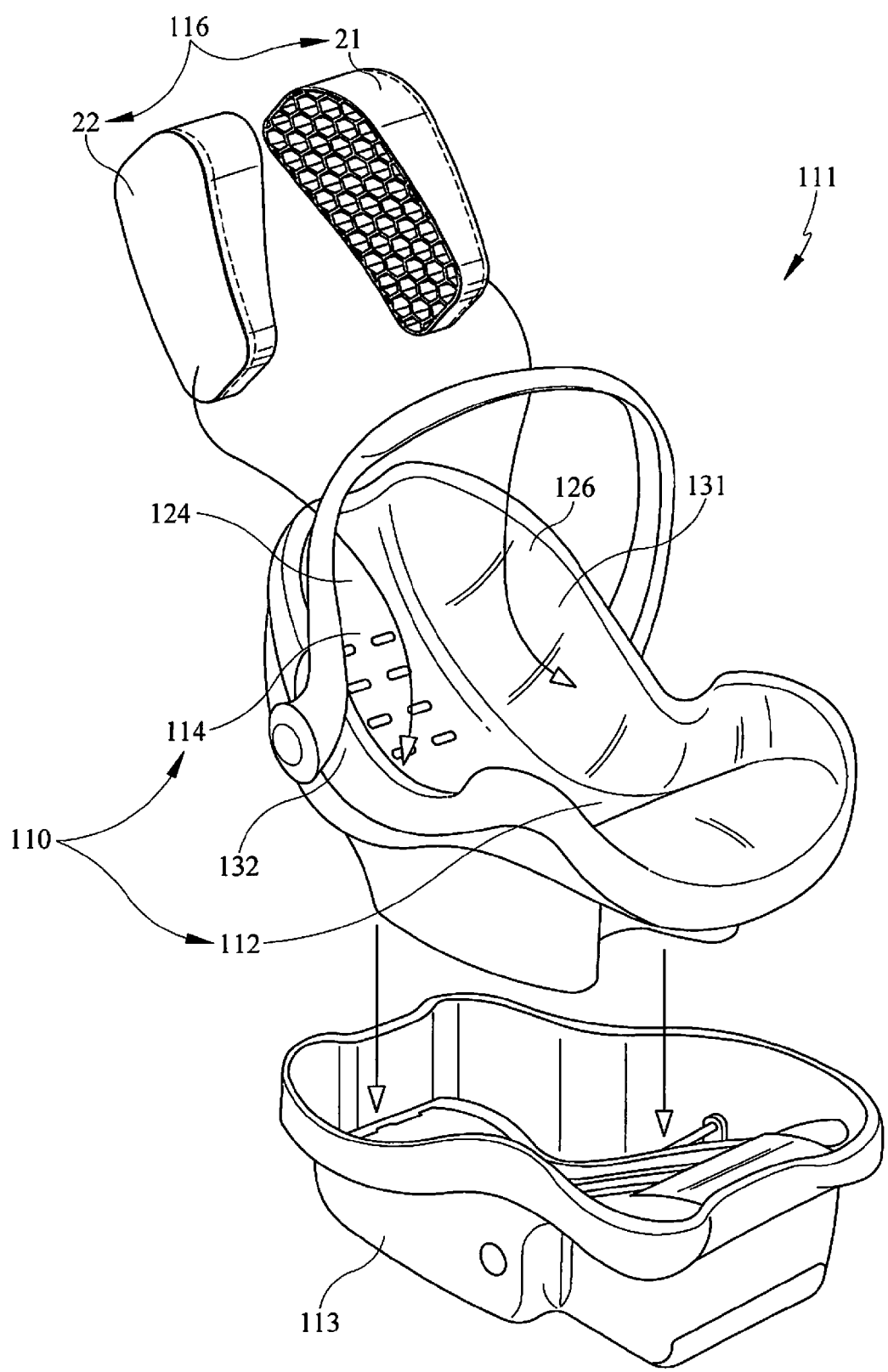
FIG. 19 is an exploded perspective assembly view of the child restraint of FIG. 18 showing that the child restraint includes, from top to bottom, an energy-dissipation system comprising the first pad foundation coupled to the first ride-down pad, the second pad foundation coupled to the second ride-down pad, the juvenile seat, and the base for supporting the juvenile seat and suggesting that the first pad foundation is coupled to an inner wall of the first side-wing panel included in the headrest and that the second pad foundation is coupled to an inner wall of the second side-wing panel included in the headrest.

A first embodiment of a child restraint 11 is shown in FIGS. 1-5 and comprises a juvenile vehicle seat 10 and a first embodiment of an energy-dissipation system 16 that is coupled to the juvenile vehicle seat 10. Another embodiment of a child restraint 111 is illustrated in FIGS. 18-19 and comprises a juvenile vehicle seat 110 and another embodiment of an energy-dissipation system 116 that is coupled to the juvenile vehicle seat 110. It is within the scope of the present disclosure to mount energy-dissipation systems 16, 116 on a juvenile seat or other device to dissipate energy transferred to such a seat or apparatus by means of an external impact force applied to the seat or apparatus.

Figure 4:
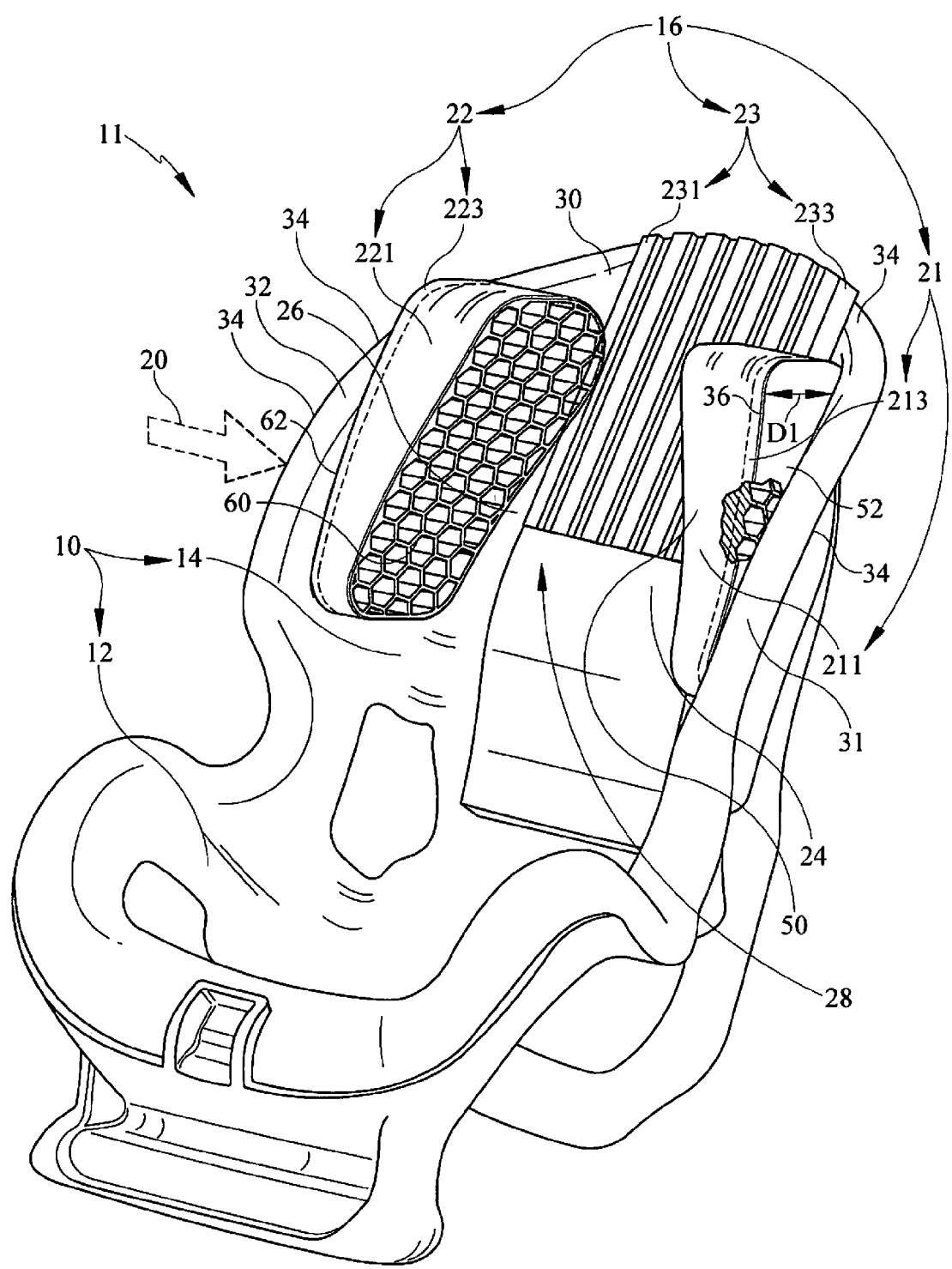
FIG. 4 is a front-left perspective view of the child restraint of FIGS. 1-3 and more clearly shows the juvenile vehicle seat having a seat bottom and a seat back extending upwardly from the seat bottom and the energy-dissipation system coupled to the seat back, and showing that the seat back comprises a backrest coupled to the seat bottom and a headrest coupled to the backrest and showing that the energy-dissipation system comprises a first pad foundation mounted on an inner wall of a first side-wing panel included in the headrest, a first ride-down pad coupled to the first pad foundation and extending away from the first side-wing panel, a second pad foundation mounted on an inner wall of an opposite, second side-wing panel included in the headrest, a second ride-down pad coupled to the second pad foundation and extending away from the second side-wing panel, a third pad foundation mounted on a forward-facing wall of a rear panel extending between the first and second side-wing panels and included in the headrest, and a third ride-down pad coupled to the third pad foundation and extending away from the rear panel.
Figure 5:
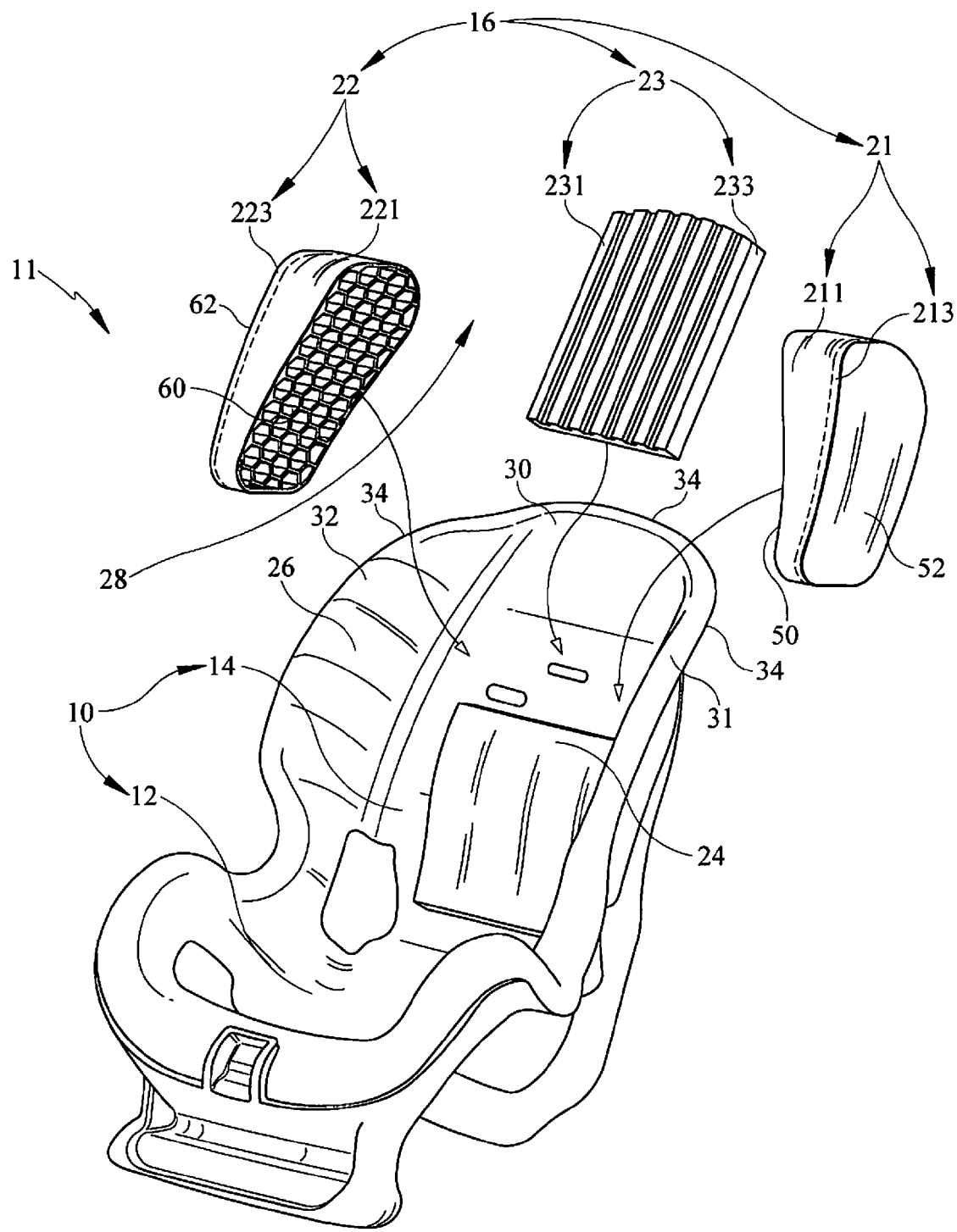
FIG. 5 is an exploded perspective assembly view of the child restraint of FIG. 4 showing that the child restraint includes, from top to bottom, an energy-dissipation system comprising the first pad foundation coupled to the first ride-down pad, the second pad foundation coupled to the second ride-down pad, and the third pad foundation coupled to the third ride-down pad and positioned to lie between the first and second ride-down pads, the first pad foundation coupled to the first ride-down pad and the second pad foundation coupled to the second ride-down pad being mountable on the inner walls of the side-wing panels in the headrest, the third pad foundation coupled to the third ride-down pad being mountable on the forward-facing wall of the seat back, the child restraint also including a juvenile seat comprising the seat back including the headrest and the backrest, and a seat bottom.

Child restraint 11 includes juvenile vehicle seat 10 and energy-dissipation system 16 as shown in FIGS. 1-5. In illustrative embodiments, juvenile vehicle seat 10 includes a seat bottom 12 and a seat back 14 extending upwardly away from seat bottom 12. Energy-dissipation system 16 is coupled to seat back 14 of juvenile vehicle seat 10 as shown in FIG. 4 and suggested in FIG. 5. Energy-dissipation system 16 comprises first, second, and third force dissipaters 21, 22, 23 that are designed to minimize the g-loads experienced by a child seated on seat bottom 12 of juvenile vehicle seat 10 during exposure of juvenile vehicle seat 10 to an external impact force 20.

As suggested in FIG. 4, energy-dissipation system 16 comprises a first force dissipater 21, a second force dissipater 22, and a third force dissipater 23. In the illustrated embodiment, energy-dissipation system 16 is coupled to seat back 14 of juvenile vehicle seat 10, and, in particular, to a headrest 26 included in seat back 14. In illustrative embodiments, energy-dissipation system 16 is mounted on an inside portion of juvenile vehicle seat 10 as suggested, for example, in FIGS. 4 and 5. It is within the scope of the present disclosure to couple one or more of the energy dissipaters included in energy-dissipation system 16 on other portions of juvenile vehicle seat 10 or other juvenile seat or device to facilitate absorption of energy caused by external impact forces applied to such seats or devices. It is also within the scope of the present disclosure to vary the number of force dissipaters coupled to juvenile vehicle seat.

Figures 1, 2, 3:
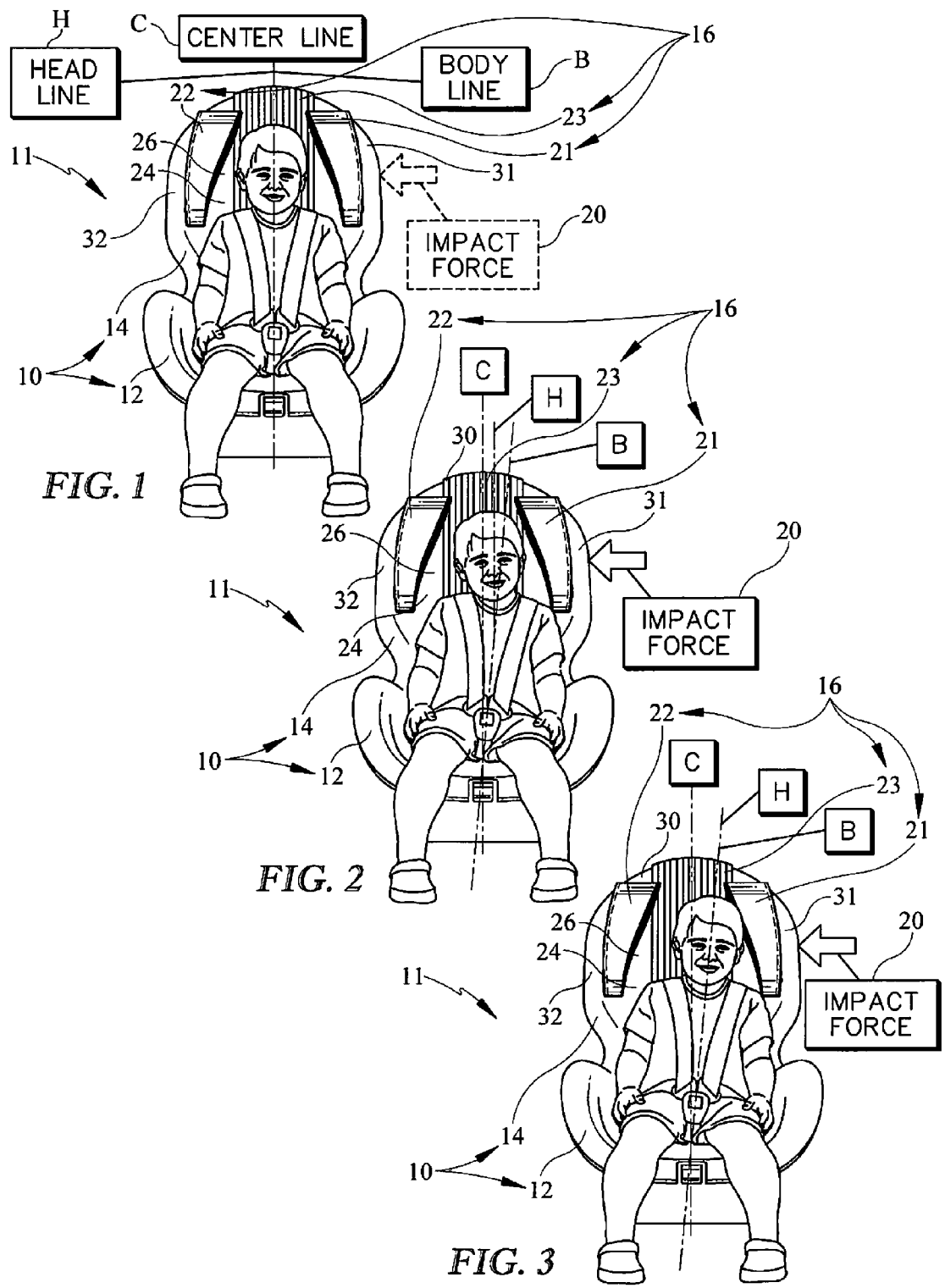
FIG. 1 is a front perspective view of a first embodiment of a child restraint including a juvenile vehicle seat having a seat bottom for an occupant or child to sit on and a seat back extending upwardly from the seat bottom, the seat back including a backrest and a headrest coupled to the backrest, the juvenile seat also including an energy-dissipation system in accordance with the present disclosure coupled to the headrest, the energy-dissipation system including a first pad foundation mounted on a first side-wing panel of the headrest, a first ride-down pad coupled to the first pad foundation, a second pad foundation mounted on a second side-wing panel of the headrest, and a second ride-down pad coupled to the second pad foundation, the head and body of the occupant substantially aligned with a center line of the juvenile vehicle seat in a position associated with normal riding conditions, the energy-dissipation system configured to minimize the movement of the child's head and upper body when the juvenile vehicle seat is subject to an impact force (dashed arrow) as seen in FIGS. 2 and 3.
FIG. 2 is a front perspective view of the child restraint of FIG. 1 just after an impact force (solid arrow) has been applied to the juvenile vehicle seat and showing that such force causes an upper body or shoulder portion of a child sitting in the juvenile vehicle seat to move in a direction opposite of the impact force relative to the juvenile vehicle seat such that the child's body line is no longer aligned with the center line of the juvenile vehicle seat and the child's upper body or shoulder portion engages with a lower, concave surface of the first ride-down pad to slow the movement of the child's upper body portion and absorb some of the energy from such movement, the child's head also moving in the direction opposite of the impact force relative to the juvenile vehicle seat as the motion of the child's upper body portion pulls the child's head toward the first ride-down pad such that the child's head line is also no longer aligned with the center line of the juvenile vehicle seat.
FIG. 3 is a front perspective view of the child restraint of FIG. 2 but at a point in time that is after FIG. 2, showing that the child's head line has aligned with the child's body line and the head of the child sitting in the juvenile vehicle seat has engaged with a upper, convex surface of the first ride-down pad that is further away from the first side-wing panel of the headrest than the lower, concave surface of the first ride-down pad, the child's head engaging with the upper, convex surface of the first ride-down pad to slow movement of the child's head in the direction opposite of the impact force and absorb some of the energy from such movement, the child's upper body or shoulder portion also still being engaged with the lower, concave surface of the first ride-down pad.

In the illustrated embodiment, seat back 14 of juvenile vehicle seat 10 includes a backrest 24 arranged to extend upwardly from seat bottom 12 and a headrest 26 coupled to an upper portion of backrest 24 and arranged to lie in spaced-apart relation to seat bottom 12. As shown in FIGS. 1 and 2, headrest 26 is coupled to backrest 24 in a fixed position. First force dissipater 21 is coupled to an inner wall of a first side-wing panel 31 included in headrest 26. Second force dissipater 22 is coupled to an inner wall of a second side-wing panel 32 included in headrest 26 to lie in spaced-apart confronting relation to first force dissipater 21 as suggested in FIGS. 1 and 1A. Third force dissipater 23 is coupled to an inner wall of a rear panel 30 as shown in FIG. 1. Third force dissipater 23 is arranged to lie and extend between first and second force dissipaters 21, 22. It is also within the scope of the present disclosure to provide a seat back comprising a headrest mounted on the backrest for up-and-down movement relative to the backrest.

As illustrated in FIGS. 1-3 and 6A-6F, energy-dissipation system 16 is configured to absorb energy from external impact forces 20 by providing means for deforming the first, second, and/or third force dissipaters 21, 22, and/or 23 at a predetermined rate when exposed to the external impact force 20 so that they first, second, and/or third force dissipaters 21, 22, and/or 23 absorb external energy associated with the external impact force 20 to reduce g-loads experienced by a child seated in the juvenile vehicle seat 10. First, second, and/or third force dissipaters 21, 22, and/or 23 are configured to deform at a predetermined deformation rate when exposed to the external impact force 20. The resulting deformation reduces the impact of the child's head as it is moves in the direction the side-wing panel 31, 32. The deformation also minimizes the acceleration of the child's head in the direction opposite of the impact force 20 during a subsequent recoil force 18.

Energy-dissipation system 16 minimizes acceleration of a child's head by reducing the distance of travel for a child's head and by absorbing impact energy to minimize deflection forces after a child's head has impacted energy-dissipation system 16. As seen in FIGS. 1-3, under normal riding conditions, the head and body of a child riding in the juvenile vehicle seat 10 align with a center-line axis C of juvenile vehicle seat 10. As show in FIGS. 1-3, center-line axis C is substantially perpendicular to the seat bottom 12 of juvenile vehicle seat 10.

As illustrated in FIGS. 1-3, the angle and movement of the head and body of a child seated in juvenile vehicle seat 10 can be represented in part by a head-line axis H and a body-line axis B. For example, head-line axis H in FIGS. 1-3 identifies an axis that extends through the middle of the child's head and substantially represents the vertical center of mass for the child's head. Similarly, body-line axis B in FIGS. 1-3 identifies an axis that extends through the middle of the child's body and substantially represents the vertical center of mass for the child's body. Prior to a collision, the child's head-line axis H and body-line axis B are coplanar with center-axis line C.

During a collision or other incident, application of an external impact force 20 to juvenile vehicle seat 10 causes juvenile vehicle seat 10 to move in the direction of impact force 20 relative to an occupant. As a result of this movement, the occupant's head-line axis H and body-line axis B move toward first force dissipater 21. Such movement causes occupant to move toward and engage first force dissipater 21. This impact causes energy to be transferred from the impacting object (such as the occupant's head) to first force dissipater 21, as suggested in FIGS. 1-4. First force dissipater 21 absorbs that transferred energy to minimize the magnitude of a resulting force applied to a child seated in juvenile vehicle seat 10 during the collision. First force dissipater 21 functions to minimize the g-loads (acceleration) experienced by the child seated on seat bottom 12 of juvenile vehicle seat 10 during exposure of juvenile vehicle seat 10 to external impact force 20 as suggested in FIGS. 1-3. First force dissipater 21 also functions to maximize the time interval (i.e., ride-down time) between the moment the impacting object strikes force dissipater 21 and the moment that resulting force reaches zero.

Figure 6:
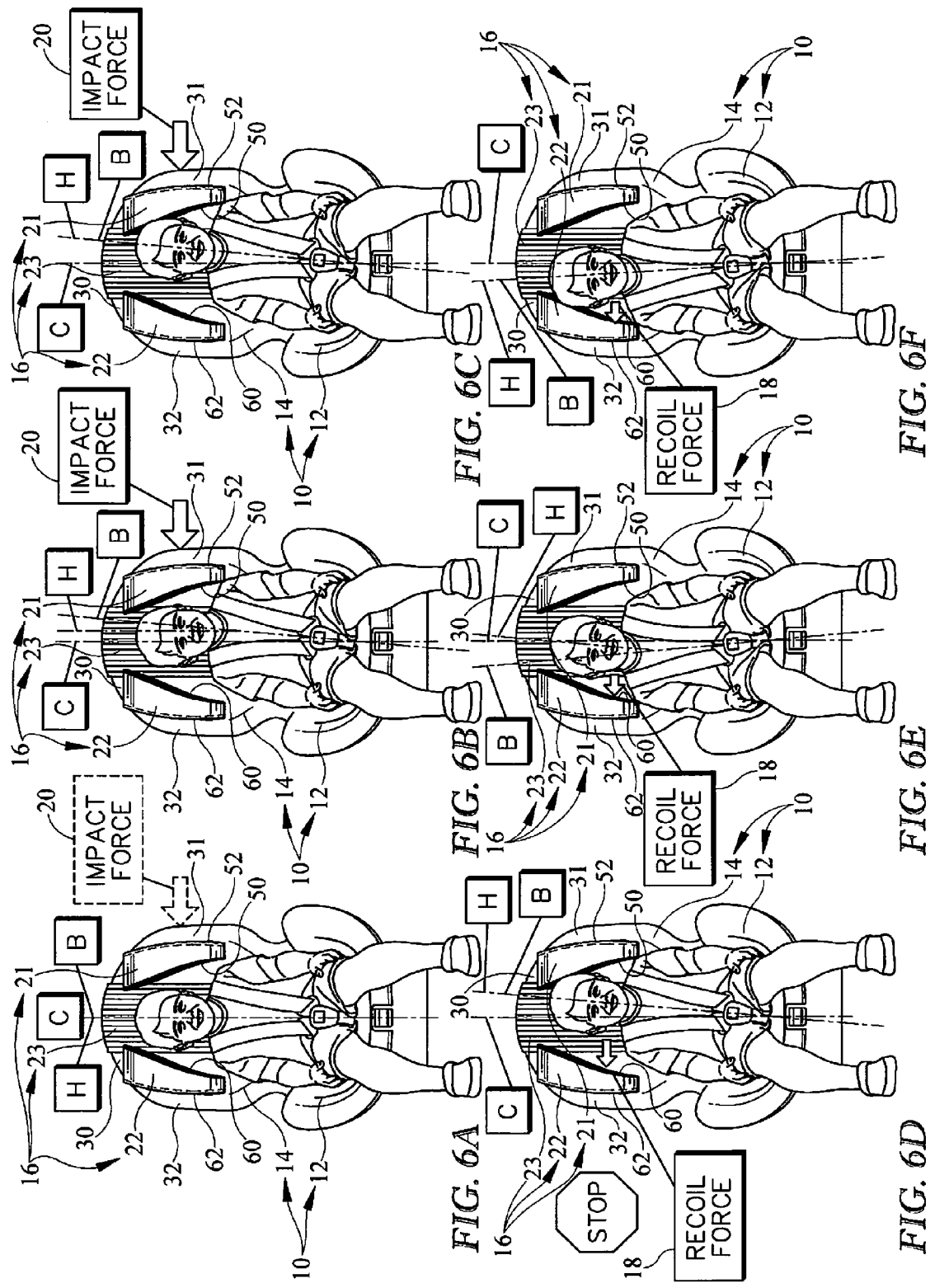
FIGS. 6A-6F are a series of views showing the energy-dissipation system of FIGS. 4 and 5 and its effect on a child seated in the child restraint when an impact force is applied to the child restraint.

As illustrated fully in FIGS. 6A-6F, inclusion of first and second force dissipaters 21 and 22 in energy-dissipation system 16 also minimizes the distance of travel for a child's head during a collision. Prior to a collision, a child's head and body are generally positioned to be aligned with center-line axis C, as seen in FIGS. 1 and 6A. Immediately following a collision, the juvenile vehicle seat 10 will be moved in the direction of the impact force 20 relative to the child, causing the child's upper body and head to move in the direction of first force dissipater 21. Energy-dissipation system 16 minimizes the distance of travel of a child's head from a first, resting position aligned with center-line axis C as seen in FIG. 6A, to a second, angled position when the child's head engages with first force dissipater 21 after the external impact force 20 has been applied as seen in FIG. 6C. In addition, if there is a substantial recoil force 18 from the child's head when it rebounds or deflects from engagement with first force dissipater 21, energy-dissipation system 16 minimizes the distance of travel for a child's head from the second, angled position as seen in FIG. 6C to a third, counter-angled position engaging with second force dissipater 22 as a result of recoil force 18 in a direction opposite of first force dissipater 21, as seen in FIG. 6F.

Energy-dissipation system 16 also minimizes the maximum difference between a child's head-line axis C and body-line axis B during a collision. As seen in FIGS. 2 and 3, energy-dissipation system 16 is configured to cause a child's body or shoulders to first impact first force dissipater 21 before a child's head impacts first force dissipater 21. In this way, first force dissipater 21 limits the angle or degree of movement of the child's body-line axis B away from center-line axis C and the child's head-line axis H. As the child's head continues to move toward first force dissipater 21, the angle between the child's head-line axis H and body-line axis B continues to shrink because the child's body-line axis B is held in place by first force dissipater 21, thereby reducing g-loads or other similar forces on the child's head, such as whiplash.

Figure 7:
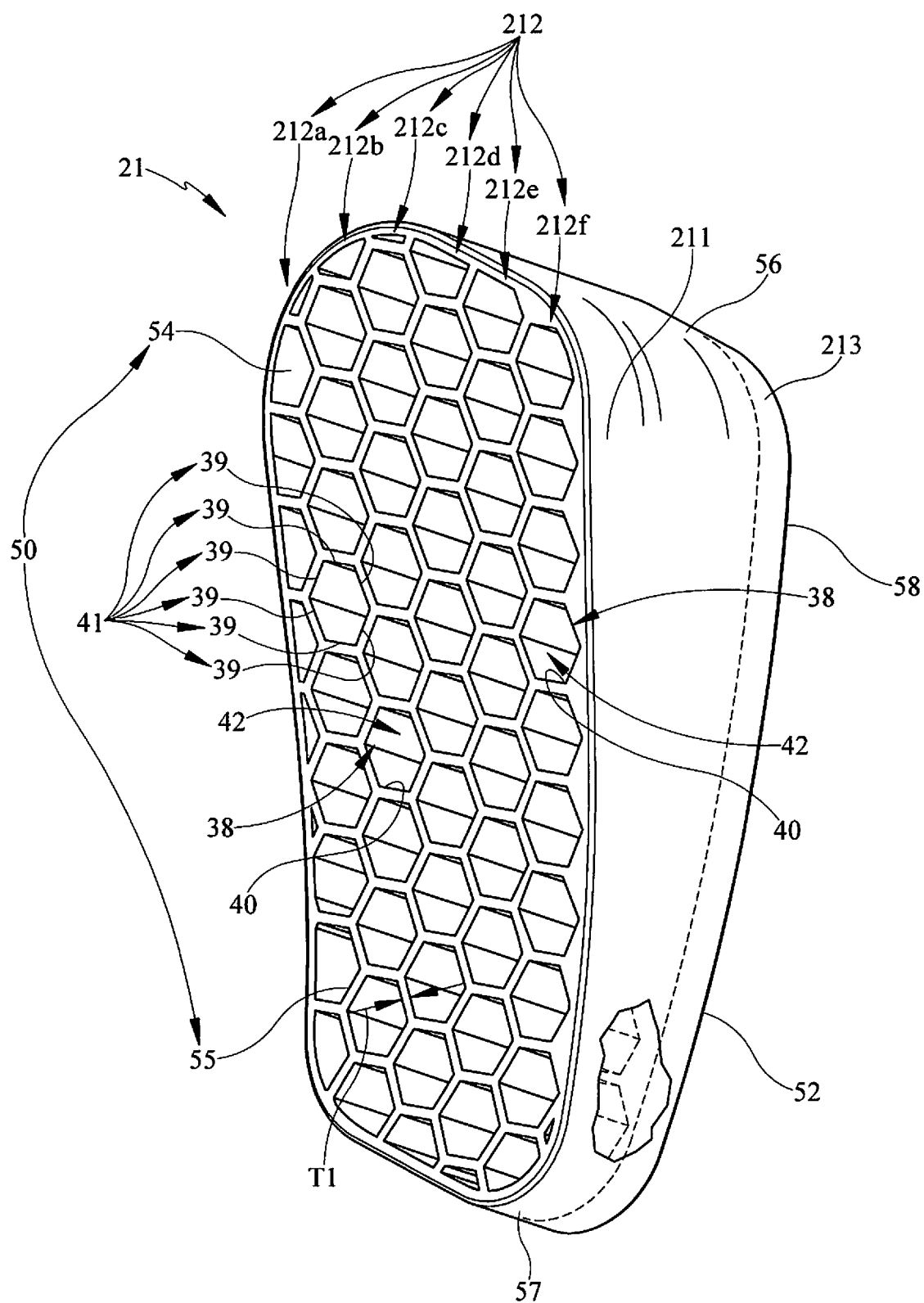
FIG. 7 is a perspective view of a portion of the energy-dissipation system of FIGS. 4 and 5 and showing the energy-dissipation system includes a first pad foundation and a first ride-down pad, the first ride-down pad including an array of outwardly projecting crush strips and the first pad foundation including a substrate that provides a means for supporting the array in spaced-apart relationship, the energy-dissipation system also including a top and bottom surface, the first ride-down pad arranged to extend away from the first side-wing panel of the vehicle seat toward the second side-wing panel of the vehicle seat when this portion of the energy-dissipation system is coupled to the first side-wing panel of the vehicle seat to extend generally parallel to the top and bottom surfaces.
Figure 8:
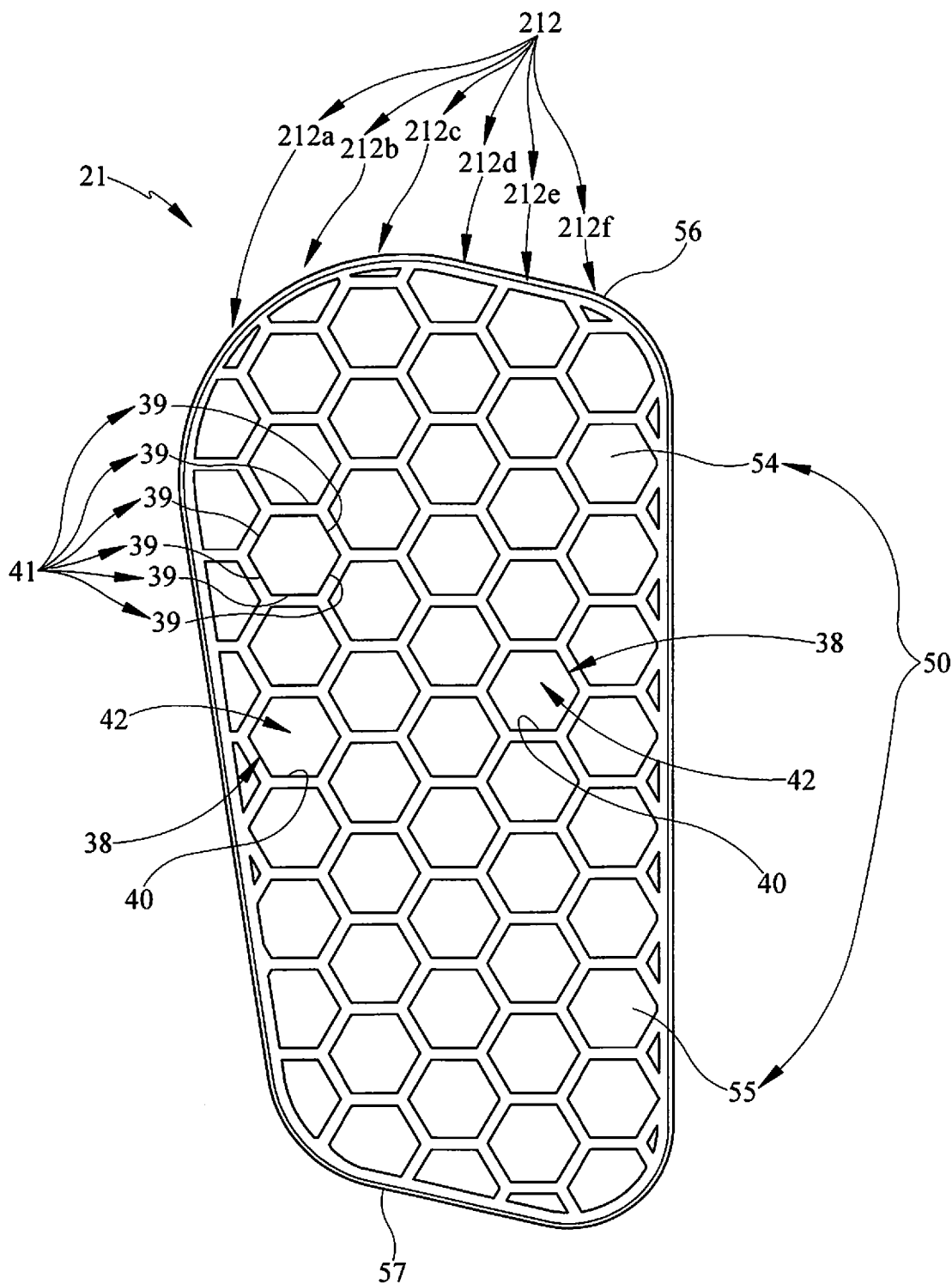
FIG. 8 is a front elevation view of the portion of the energy-dissipation system of FIG. 7 and showing the crush strips of the first ride-down pad being vertically oriented and formed by a series of hexagon-shaped structures or crush cells coupled to one another, the crush cells formed to include a crush aperture or a hexagon-shaped crush aperture that opens into a crush space formed in the crush cells, the crush cells having six walls of having a generally uniform thickness.

As suggested in FIG. 7, first force dissipater 21 includes a first pad foundation 213 coupled to the seat backrest 24 and a first ride-down pad 211. First ride-down pad 211 includes an array of outwardly projecting crush strips 212. First ride-down pad 211 of outwardly projecting crush strips 212 is arranged to extend away from first side-wing panel 31 toward second side-wing panel 32. As shown in FIGS. 7 and 8, first ride-down pad 211 includes a series of vertically oriented crush strips 212a, 212b, 212c, 212d, 212e, and 212f coupled together. As an illustrative example, a series of hexagon-shaped structures or crush cells 38 are coupled to one another to establish crush strip 212a as shown in FIGS. 7 and 8. Another series of crush cells 38 are coupled together to establish another crush strip 212b as shown in FIGS. 7 and 8. Crush strips 212a, 212b are coupled together with other crush strips 212c, 212d, 212e, and 212f to establish first ride-down pad 211.

Each crush cell 38 includes six walls 39 each having about the same length. As shown in FIGS. 7 and 8, each crush cell 38 is formed to include a hexagon-shaped crush aperture 40 arranged to open into a crush space 42 formed in crush cells 38. Crush space 42 is defined between the six walls 39 of crush cell 38. The six walls 39 are coupled to one another to establish a crush-cell perimeter 41. Each wall 39 has an illustrative first thickness T1 as shown in FIG. 7.

First pad foundation 213 is coupled to first ride-down pad 211 as shown, for example, in FIGS. 7-10. First pad foundation 213 is configured to provide means for supporting first ride-down pad 211 of crush strips 212 in spaced-apart relation to headrest 26. First pad foundation 213 interconnects first ride-down pad 211 to headrest 26, and in particular, to first side-wing panel 31 as shown in FIG. 4. It is within the scope of the present disclosure for first pad foundation 213 to be coupled to first ride-down pad 211. It is also within the scope of the present disclosure for first ride-down pad 211 and pad foundation 213 to cooperate to form a monolithic, first force dissipater 21.

As an example, pad foundation 213 is a sheet of foam material. A sheet is defined to be a broad, relatively thin layer of material having a generally constant density throughout. However, it is within the scope of the present disclosure for pad foundation 213 to be a layer of material including various structures that define voids in the substrate. Furthermore, the wall thickness may be varied so as to increase or decrease a volume of the void. Also, the height of the crush cell 38 may be varied.

Figure 9:
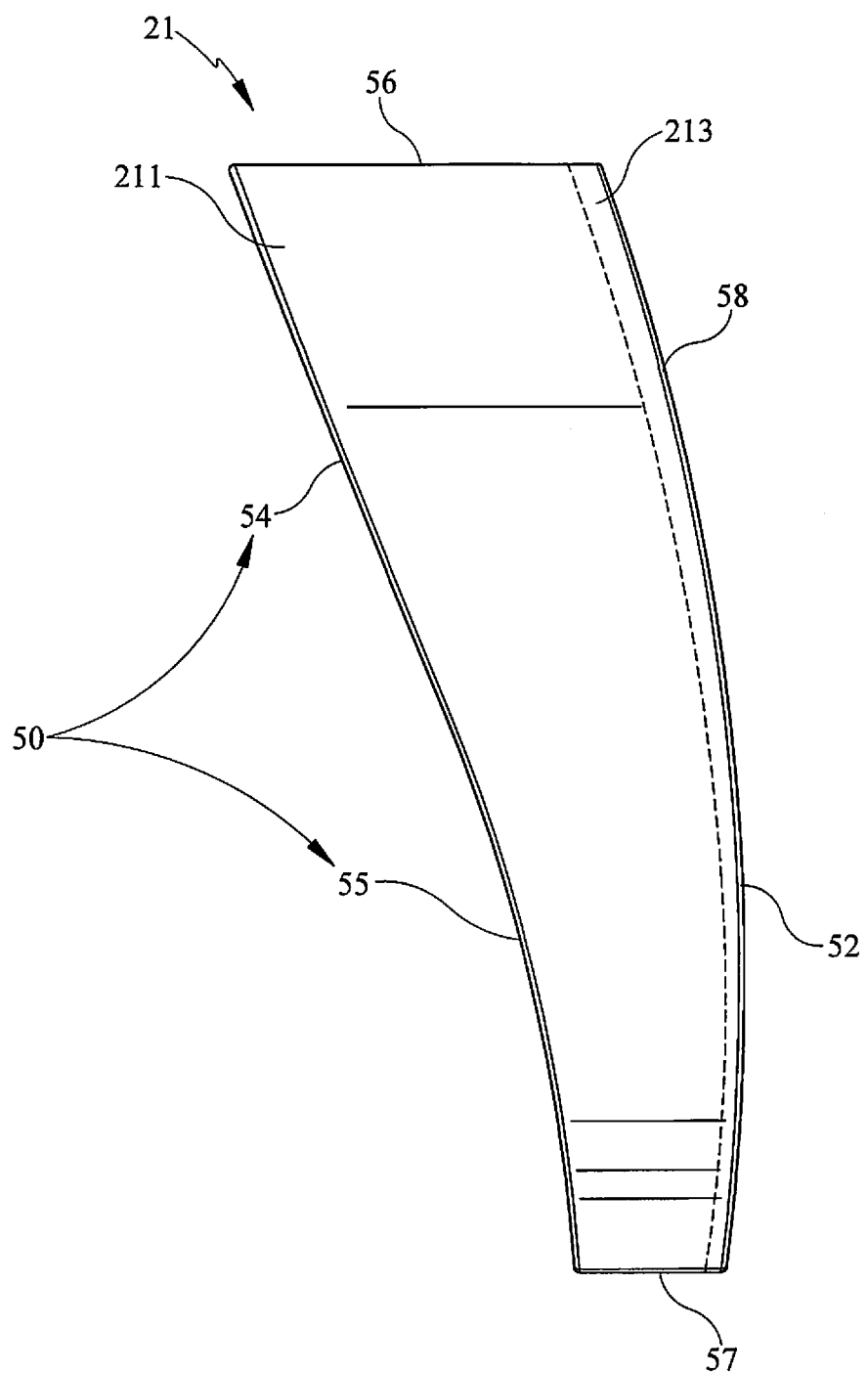
FIG. 9 is a left elevation view of the portion of the energy-dissipation system of FIG. 7, showing the first ride-down pad includes a lower, concave surface and an upper, convex surface on a side of the ride-down pad that faces towards the child when this portion of the energy-dissipation system is coupled to the first side-wing panel of the vehicle seat.
Figure 10:
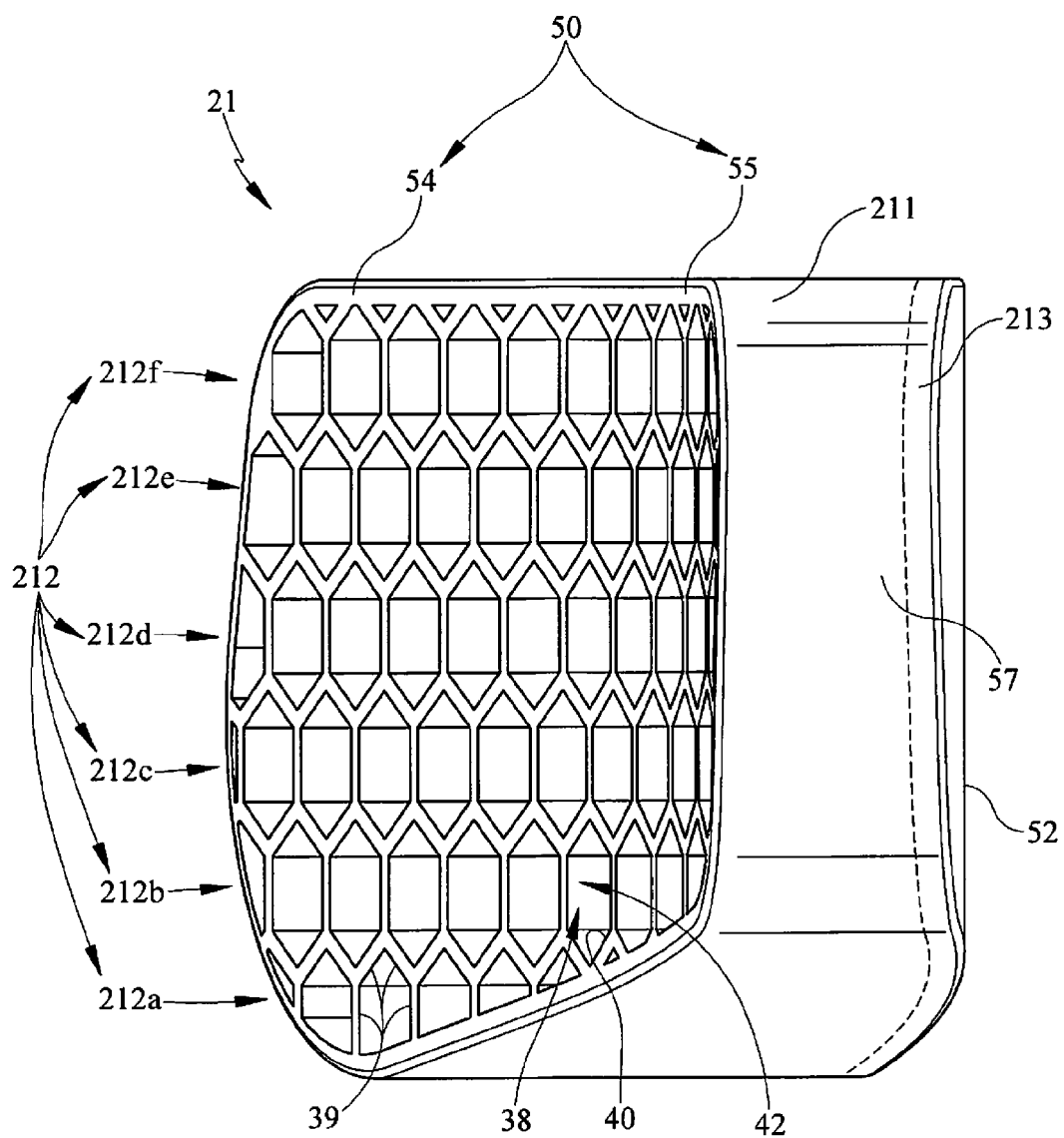
FIG. 10 is a bottom view of the portion of the energy-dissipation system of FIG. 7 showing the array of outwardly projecting crush strips and the increase in depth of this portion of the energy-dissipation system as it extends upward in a direction away from the bottom surface of this portion of the energy-dissipation system.

As seen in FIGS. 6A-6F and 9, first force dissipater 21 includes a front surface 50 and a back surface 52. Front surface 50 faces inward toward the child and back surface 52 faces outward toward first side-wing panel 31 when first force dissipater 21 is coupled to headrest 26 of juvenile vehicle seat 10. Front surface 50 includes an upper, convex surface 54 and a lower, concave surface 55 configured to engage with a child's head or upper body portion, respectively, during a collision, as illustrated in FIGS. 7 and 9. Convex surface 54 is positioned between concave surface 55 and a top surface 56 of first force dissipater 21, and concave surface 55 is positioned between convex surface 54 and a bottom surface 57 of first force dissipater 21. Back surface 52 includes a back convex surface 58, as illustrated in FIGS. 7 and 9.

As illustrated in FIGS. 6A-6F and 9, first force dissipater 21 is wider near convex surface 54 than it is near concave surface 55. Bottom surface 57 is smaller in width than top surface 56 as a result of the smaller width of the first force dissipater 21 near concave surface 55. In this manner, first force dissipater 21 is arranged to correspond to a child's upper body with concave surface 55 and a child's head with convex surface 54. The result of this arrangement is that a child's upper body portion will engage with concave surface 55 of first force dissipater 21 before a child's head will engage with convex surface 54 of first force dissipater 21 after an external impact force 20 has impacted the juvenile vehicle seat 10.

Figure 11:
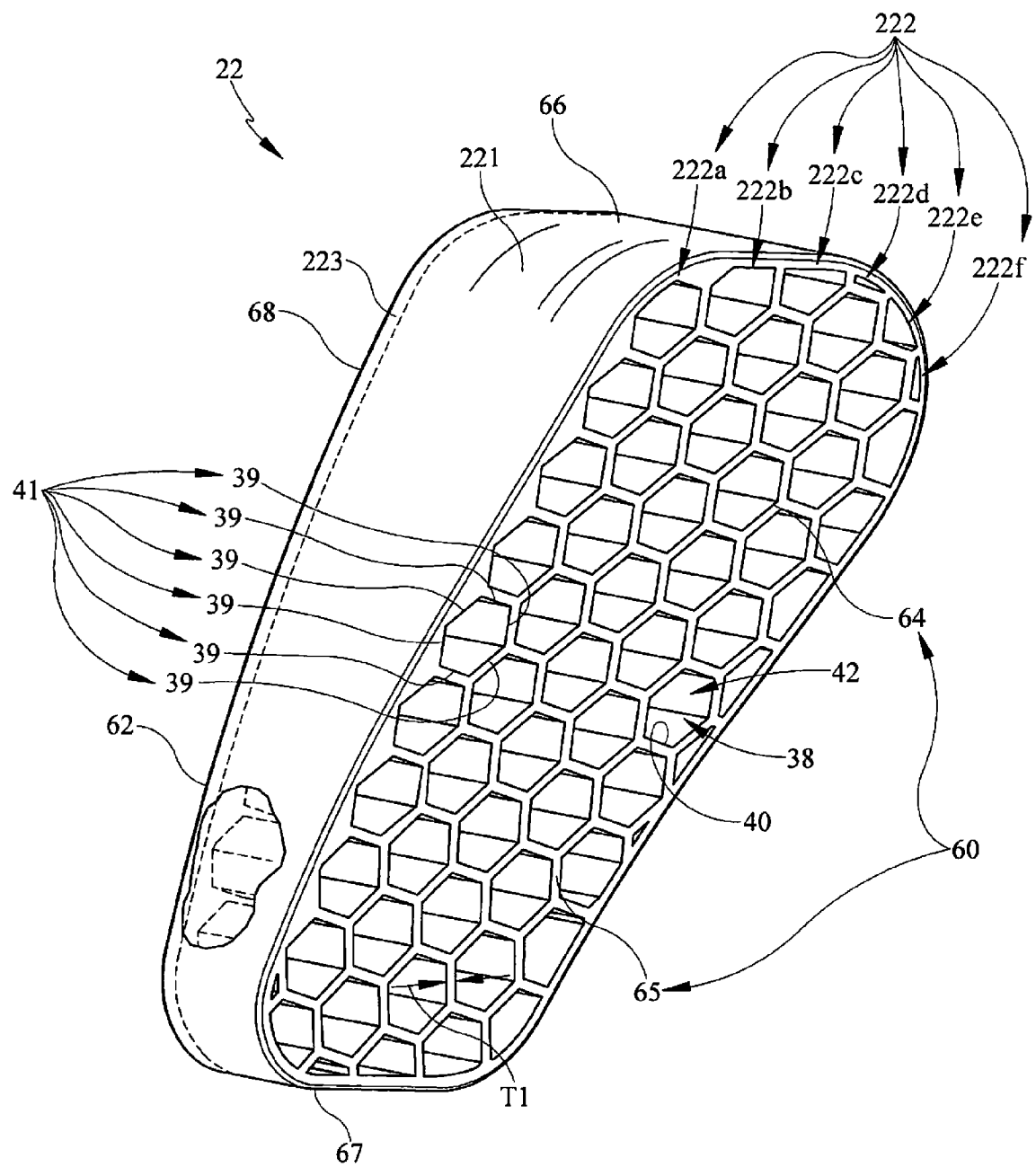
FIG. 11 is a perspective view of a portion of the energy-dissipation system of FIGS. 4 and 5 and showing the energy-dissipation system includes a second pad foundation and a second ride-down pad, the second ride-down pad including an array of outwardly projecting crush strips and the second pad foundation including a substrate that provides a means for supporting the array in spaced-apart relationship, the energy-dissipation system also including a top and bottom surface, the second ride-down pad arranged to extend away from the second side-wing panel of the vehicle seat toward the first side-wing panel of the vehicle seat when this portion of the energy-dissipation system is coupled to the second side-wing panel of the vehicle seat to extend generally parallel to the top and bottom surfaces.
Figure 12:
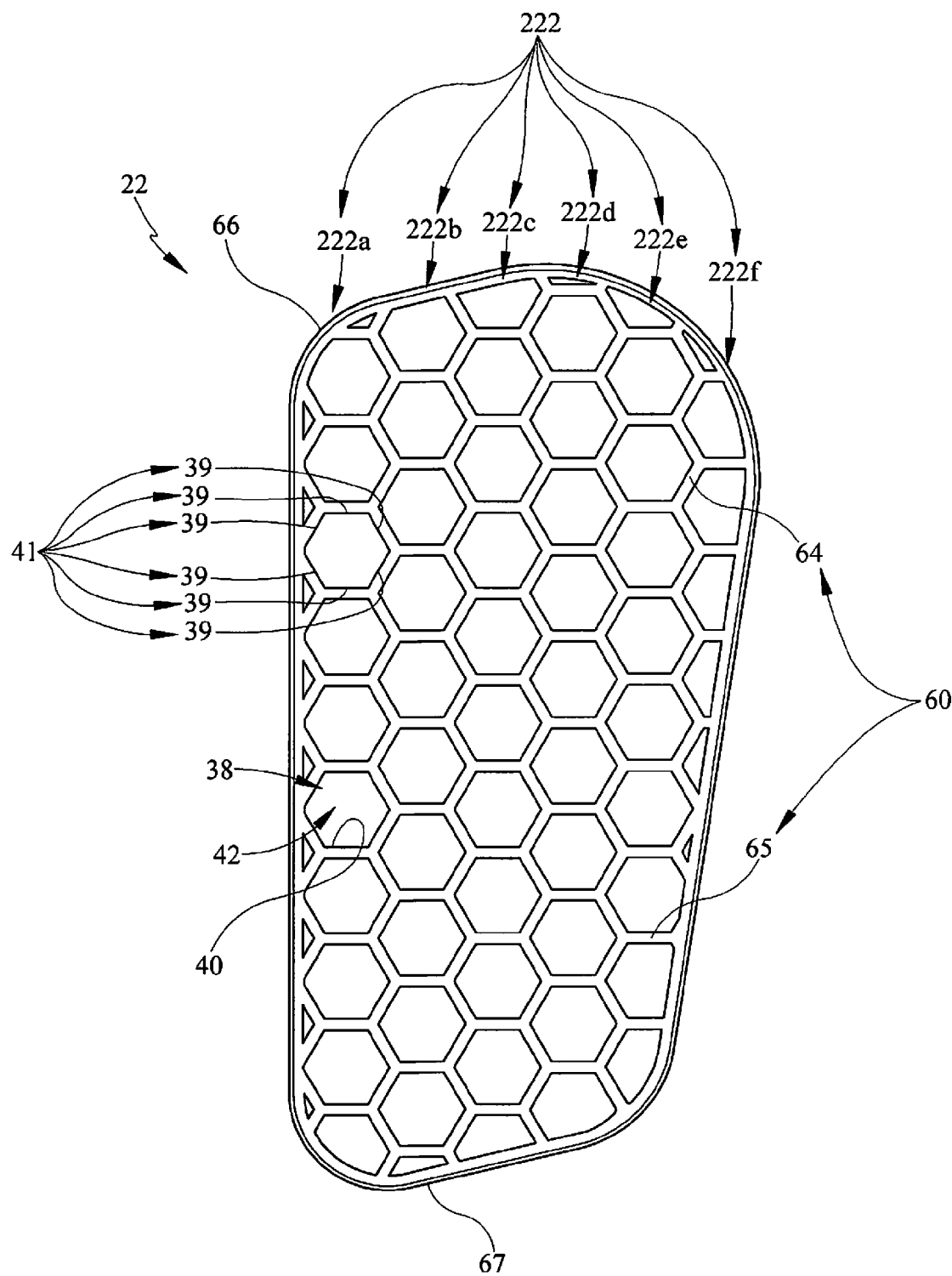
FIG. 12 is a front elevation view of the portion of the energy-dissipation system of FIG. 11 and showing the crush strips of the second ride-down pad being vertically oriented and formed by a series of hexagon-shaped structures or crush cells coupled to one another, the crush cells formed to include a crush aperture or a hexagon-shaped crush aperture that opens into a crush space formed in the crush cells, the crush cells having six walls of having a generally uniform thickness.

As suggested in FIG. 11, second force dissipater 22 includes a second pad foundation 223 coupled to the seat backrest 24 and a second ride-down pad 221. Second ride-down pad 221 includes an array of outwardly projecting crush strips 222a, 222b, 222c, 222d, 222e, and 222f as shown in FIGS. 11-14. Second ride-down pad 221 of outwardly projecting crush strips 222 is arranged to extend away from second side-wing panel 32 toward first side-wing panel 31. As shown in FIGS. 11 and 12, second ride-down pad 221 includes a series of vertically oriented crush strips 222 coupled together. As an illustrative example, series of crush cells 38 are coupled to one another to establish crush strip 222a as shown in FIGS. 11 and 12. Another series of crush cells 38 are coupled together to one another establish another crush strip 222b as shown in FIGS. 11 and 12. Crush strips 222a, 222b are coupled together with other crush strips 222c, 222d, 222e, and 222f to establish second ride-down pad 221.

Second pad foundation 223 is coupled to second ride-down pad 221 as shown, for example, in FIGS. 11-14. Second pad foundation 223 is configured to provide means for supporting second ride-down pad 221 of crush strips 222 in spaced-apart relation to headrest 26. Second pad foundation 223 interconnects second ride-down pad 221 to headrest 26, and in particular, to second side-wing panel 32 as shown in FIG. 4. It is within the scope of the present disclosure for second pad foundation 223 to be coupled to second ride-down pad 221. It is also within the scope of the present disclosure for second ride-down pad 221 and second pad foundation 223 to cooperate to form a monolithic second force dissipater 22.

As an example, second pad foundation 223 is a sheet of foam material. A sheet is defined to be a broad, relatively thin layer of material having a generally constant density throughout. However, it is within the scope of the present disclosure for second pad foundation 223 to be a layer of material including various structures that define voids in the substrate. Furthermore, the wall thickness may be varied so as to increase or decrease a volume of the void. Also, the height of the crush cell 38 may be varied.

Each crush cell 38 includes six walls 39 each having about the same length. As shown in FIGS. 11 and 12, each crush cell 38 is formed to include hexagon-shaped crush aperture 40 arranged to open into crush space 42 formed in crush cell 38. The six walls 39 of the crush cell 38 define crush aperture 40. Crush space 42 is defined between the six walls 39. The six walls 39 are coupled to one another to establish crush-cell perimeter 41. Each wall has a first thickness T1 as shown in FIG. 11. It is within the scope of the present disclosure to vary the wall 39 thickness so as to increase or decrease a volume of the crush space 42.

Figure 13:
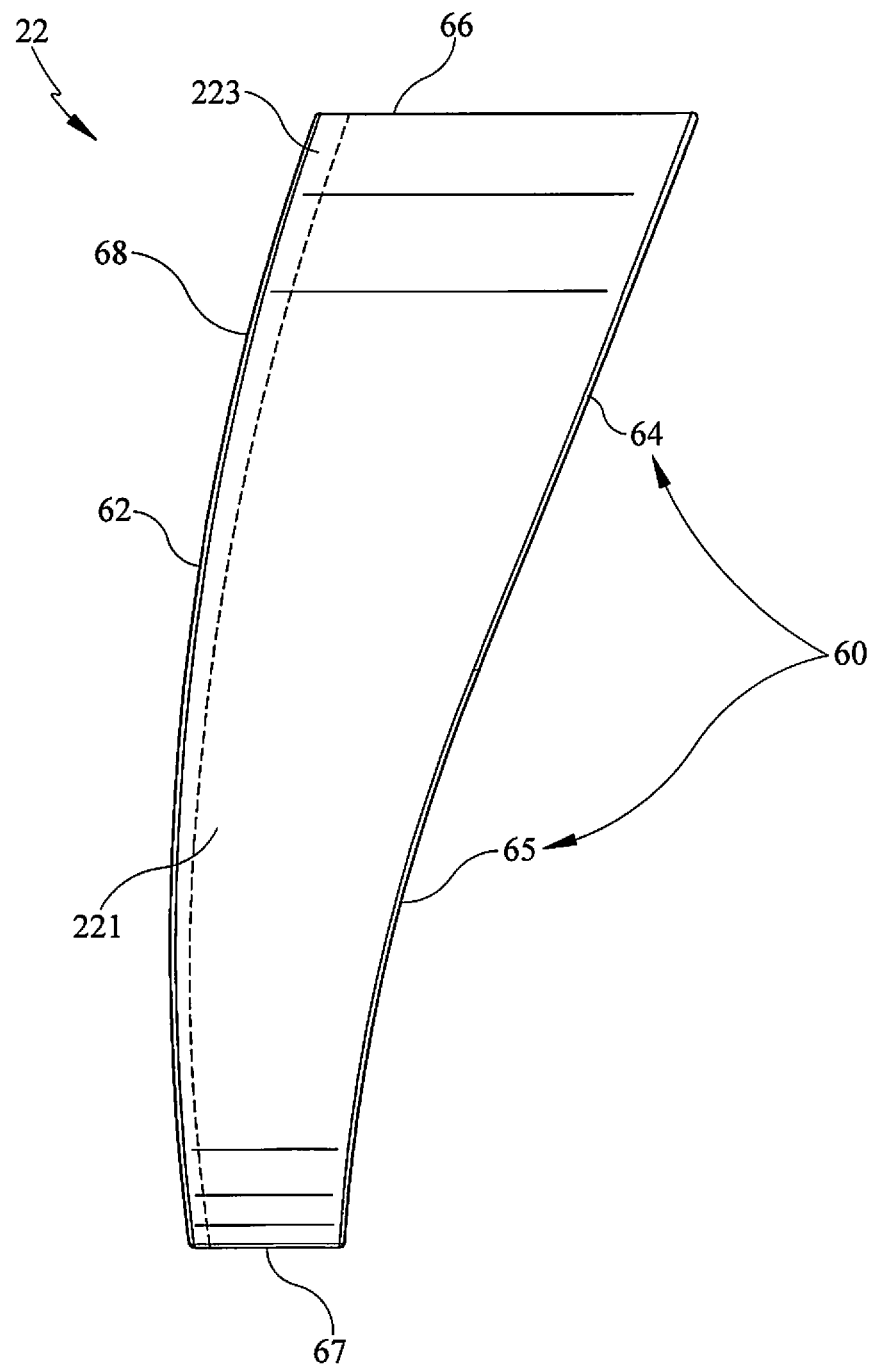
FIG. 13 is a left elevation view of the portion of the energy-dissipation system of FIG. 11, showing the second ride-down pad includes a lower, concave surface and an upper, convex surface on a side of the second ride-down pad that faces towards the child when this portion of the energy-dissipation system is coupled to the second side-wing panel of the vehicle seat.
Figure 14:
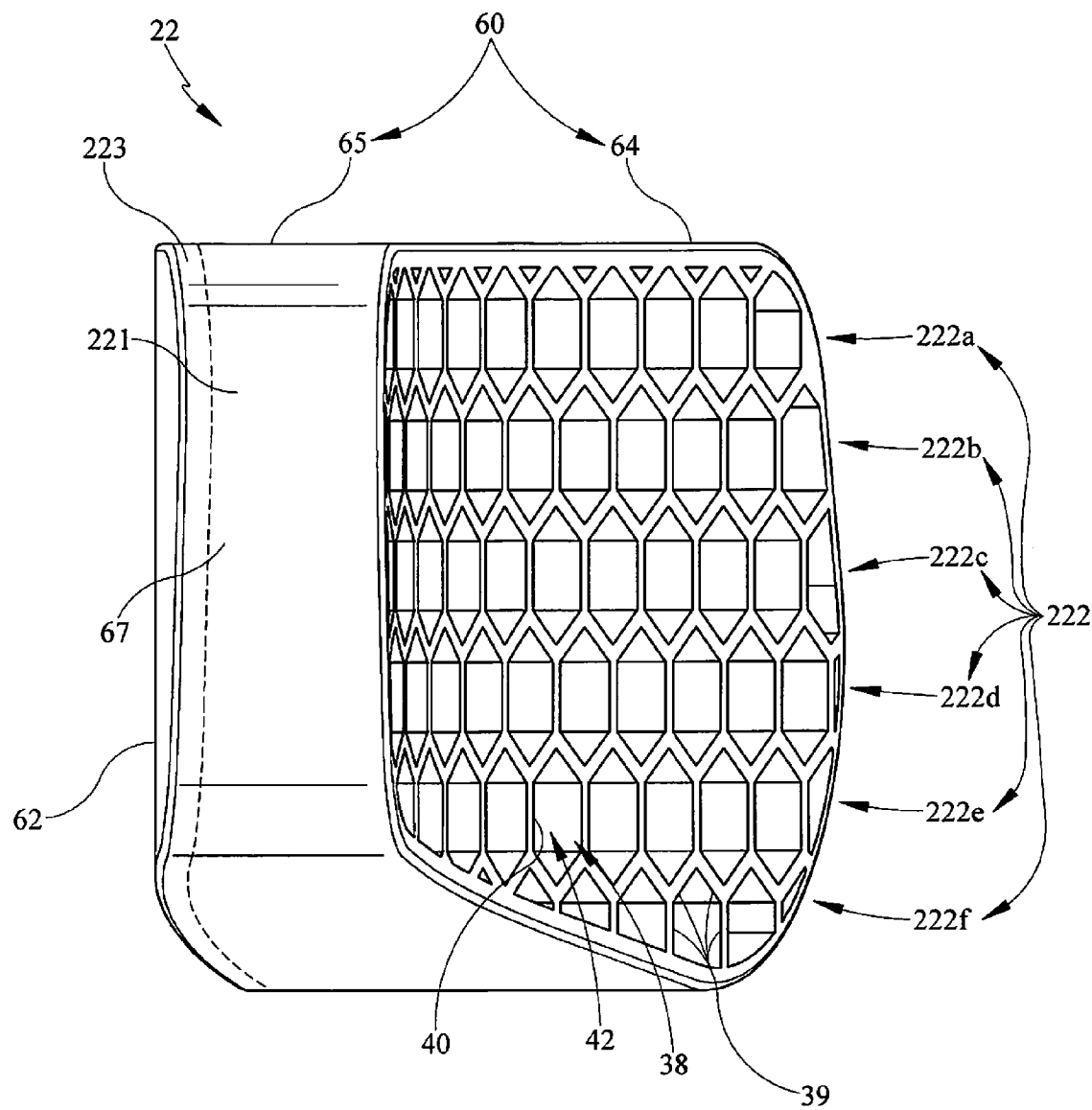
FIG. 14 is a bottom view of the portion of the energy-dissipation system of FIG. 11 showing the array of outwardly projecting crush strips and the increase in depth of this portion of the energy-dissipation system as it extends upward in a direction away from the bottom surface of this portion of the energy-dissipation system.

As seen in FIGS. 6A-6F and 13, second force dissipater 22 includes a front surface 60 and a back surface 62. Front surface 60 faces inward toward the child and back surface 62 faces outward toward second side-wing panel 32 when second force dissipater 22 is coupled to headrest 26 of juvenile vehicle seat 10. Front surface 60 includes an upper, convex surface 64 and a lower, concave surface 65 configured to engage with a child's head or upper body portion, respectively, during a collision, as illustrated in FIGS. 11 and 13. Convex surface 64 is positioned between concave surface 65 and a top surface 66 of second force dissipater 22, and concave surface 65 is positioned between convex surface 64 and a bottom surface 67 of second force dissipater 22. Back surface 62 includes a back convex surface 68, as illustrated in FIGS. 11 and 13.

As illustrated in FIGS. 6A-6F and 13, second force dissipater 22 is wider near convex surface 64 than it is near concave surface 65. Bottom surface 67 is smaller in width than top surface 66 as a result of the smaller width of the second force dissipater 22 near concave surface 65. In this manner, second force dissipater 22 is arranged to correspond to a child's upper body with concave surface 65 and a child's head with convex surface 64. The result of this arrangement is that a child's upper body portion will engage with concave surface 65 of second force dissipater 22 before a child's head will engage with convex surface 64 of second force dissipater 22 after an external impact force 20 has impacted the juvenile vehicle seat 10.

Figure 15:
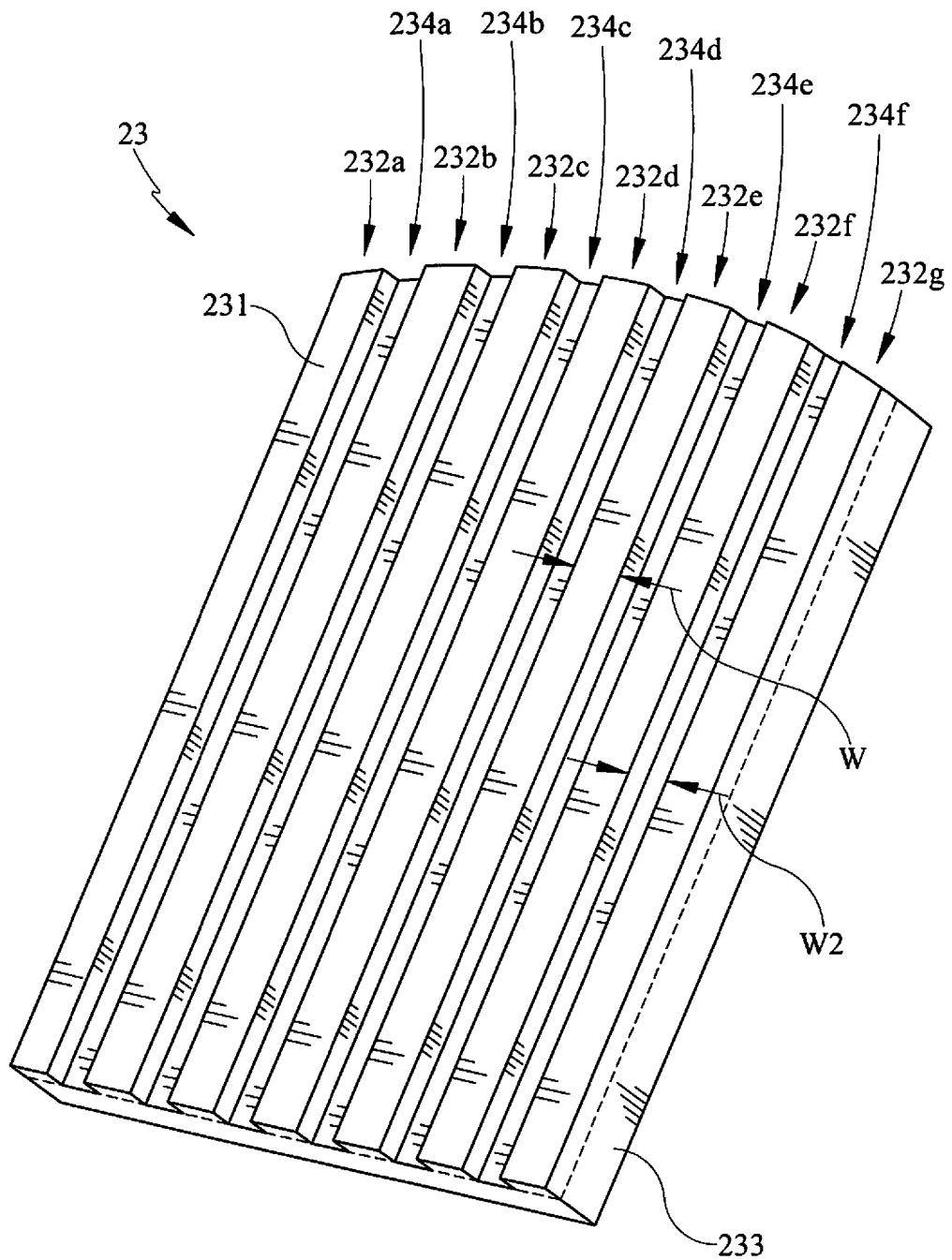
FIG. 15 is a perspective view of the third pad foundation and third ride-down pad included in the energy-dissipation system of FIGS. 4 and 5, the third ride-down pad including an array of outwardly projecting crush strips arranged to extend away from the third pad foundation when the third pad foundation is coupled to a rear panel of the headrest of the child restraint and showing the crush strips lie is spaced apart relationship to each other and define channels therebetween.
Figure 16:
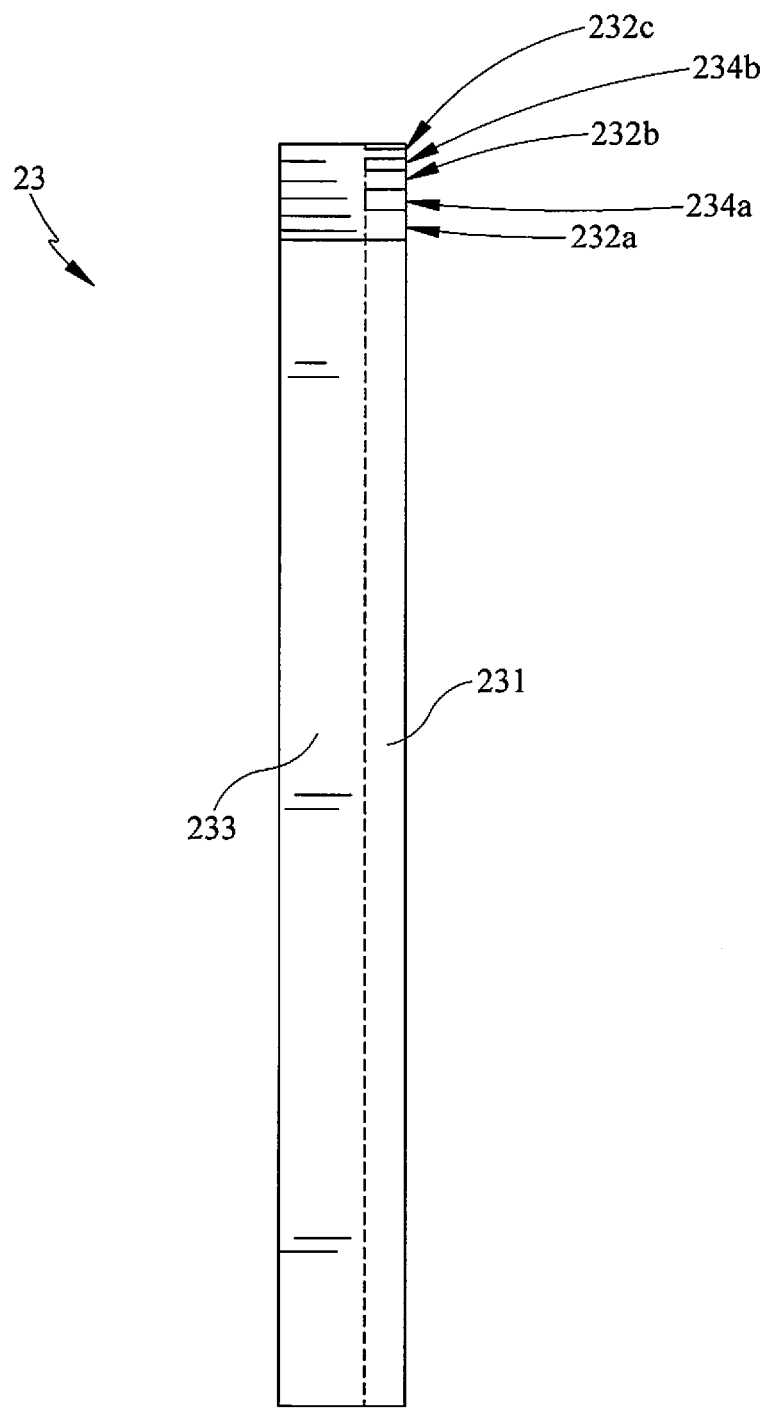
FIG. 16 is a left elevation view of the third pad foundation and third ride-down pad of FIG. 15 showing the third pad foundation is coupled to the array of outwardly projecting crush strips of the third-ride down pad and configured to provide a means for interconnecting the crush strips in spaced-apart relation to each other.
Figure 17:
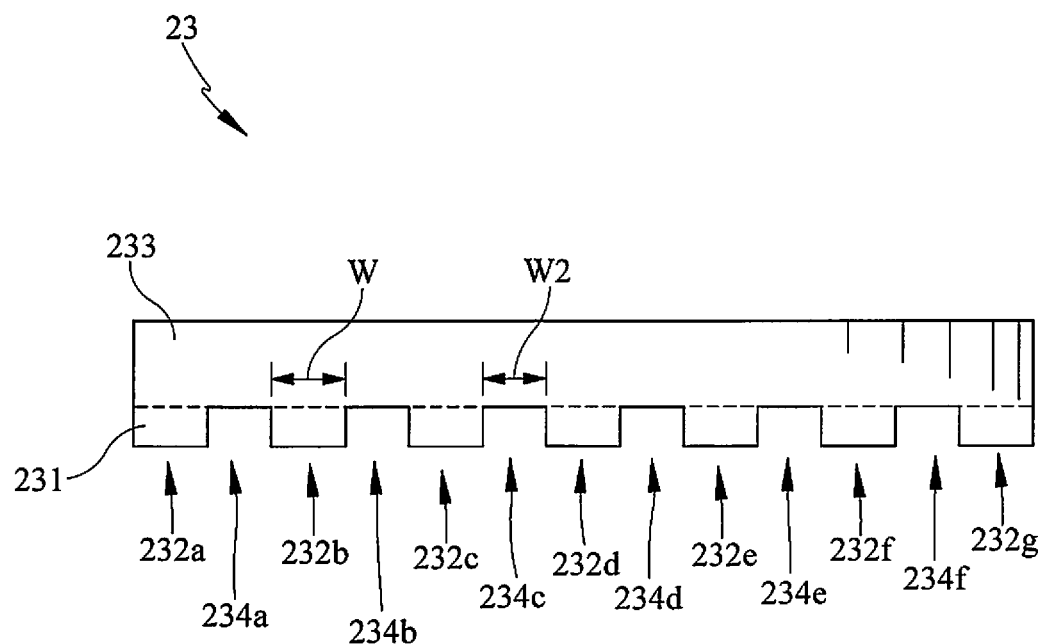
FIG. 17 is a top plan view of the third pad foundation and third ride-down pad of FIG. 15, showing the crush strips are spaced apart from one another to define a companion slot therebetween, the crush strips and the companion slots extending the full length of the third ride-down pad.

As suggested in FIG. 15, third force dissipater 23 includes a third pad foundation 233 coupled to the seat backrest 24 and a third ride-down pad 231. Third ride-down pad 231 includes an array of outwardly projecting crush strips 232a, 232b, 232c, 232d, 232e, 232f, and 232g as shown in FIGS. 15-17. Third ride-down pad 231 of outwardly projecting crush strips 232a, 232b, 232c, 232d, 232e, 232f, and 232g is arranged to extend away from rear panel 30 of headrest 26 into space 28 defined between first and second force dissipaters 21, 22 as shown in FIG. 4. As an illustrative example, a first crush strip 232a is an extended portion that is positioned to lie in spaced-apart relation to a second crush strip 232b to define a slot or channel portion 234a therebetween. Each pair of adjacent crush strips 232 is spaced apart from one another to define a companion channel portion 234a therebetween as shown in FIGS. 15 and 17.

As shown in FIG. 15, each extended portion of crush strips 232 has a rectangular shape and has a first width W. Each channel portion 234 defined between each adjacent pair of crush strips 232 has a second width W2. It is within the scope of the present disclosure for first width W to be about equal to second width W2. It is also within the scope of the present disclosure for first width W to be less than second width W2 or greater than second width W2.

Third pad foundation 233 is coupled to third ride-down pad 231 as shown, for example, in FIGS. 15-17. Third pad foundation 233 is configured to provide means for supporting third ride-down pad 231 of crush strips 232 in spaced-apart relation to headrest 26. Third pad foundation 233 interconnects third ride-down pad 231 to headrest 26, and in particular, to rear panel 30 as shown in FIG. 4. It is within the scope of the present disclosure for third pad foundation 233 to be coupled to third ride-down pad 231. It is also within the scope of the present disclosure for third ride-down pad 231 and third pad foundation 233 to cooperate to form a monolithic third force dissipater 23.

As an example, third pad foundation 233 is a substrate or sheet of foam material. A sheet is defined to be a broad, relatively thin layer of material having a generally constant density throughout. However, it is within the scope of the present disclosure for third pad foundation 233 to be a layer of material including various structures that define voids in the third-pad foundation 233. Furthermore, the wall thickness may be varied so as to increase or decrease a volume of the void.

Any suitable means may be used to retain first, second, and third force dissipaters 21, 22, 23 in the mounted positions shown in FIGS. 1-4 and 6A-6F. As an example, force dissipaters may be coupled to panels 30, 31, 32 using fasteners such as hook-and-loop fasteners, glue, or any other suitable alternatives. In an illustrative embodiment, a fastener retains first force dissipater 21 in a fixed position relative to first side-wing panel 31.

Each of first, second, and third force dissipaters 21, 22, 23 is configured to deform at about a predetermined rate when exposed to a predetermined external impact force 20. It is within the scope of this disclosure to make first, second, and third force dissipaters 21, 22, 23 out of crushable designed material, foams (e.g., extruded polymer products, extra cellular polymer substances, Polyurethane (PU), Thermoplastic Elastomer (TPE), Polypropylene (PP), Expanded Polypropylene (EPP), Expanded Polystyrene (EPS) etc.), polystyrene (PS), or combinations of the foregoing materials.

Force dissipaters may be arranged to extend beyond a rim 34 of headrest 26 as shown, for example, in FIG. 4. Headrest 26 includes rim 34 that extends along first side-wing panel 31, rear panel 30, and second side-wing panel 32 and faces upwardly away from seat back 14. As shown in FIG. 4, second force dissipater 22 includes a front perimeter surface 36 that extends outwardly beyond rim 34 and faces away from headrest 26. As an illustrative example, second force dissipater 22 extends beyond rim 34 a distance D1 which is defined to be between rim 34 and front perimeter surface 36 as shown in FIG. 4. It is also within the scope of the present disclosure for front perimeter surface 36 to lie below rim 34. It is also within the scope of the present disclosure for the front perimeter surface to be configured to match the shape of rim 34 so that the front perimeter surface does not lie below or extend beyond rim 34.

A second illustrative child restraint 111 includes juvenile vehicle seat 110, a seat base 113, and energy-dissipation system 116 as shown in FIGS. 18 and 19. Juvenile vehicle seat 110 is coupled to seat base 113 which is couple to a vehicle seat 44 as suggested in FIG. 18. Energy-dissipation system 116 comprises a force dissipater that is designed to minimize the g-loads experienced by a child seated on a seat bottom 112 of juvenile vehicle seat 110 during exposure of juvenile vehicle seat 110 to an external impact force. As an illustrative example, energy-dissipation system 116 includes first and second force dissipaters 21, 22 as shown in FIGS. 18 and 19.

As shown in FIG. 18, energy-dissipation system 116 is coupled to seat back 114 of juvenile vehicle seat 110, and, in particular, to a headrest 126 included in seat back 114. In illustrative embodiments, energy-dissipation system 116 is mounted on an inside portion of juvenile vehicle seat 110 as suggested, for example, in FIGS. 18 and 19. It is within the scope of the present disclosure to couple one or more of the force dissipaters included in energy-dissipation system 116 on other portions of juvenile vehicle seat 110 or other juvenile seat or device to facilitate absorption of energy caused by external impact forces applied to such seats or devices. It is also within the scope of the present disclosure to vary the number of force dissipaters coupled to the juvenile vehicle seat.

In the illustrated embodiment, seat back 114 of juvenile vehicle seat 110 includes a backrest. 124 arranged to extend upwardly from seat bottom 112 and headrest 126 coupled to backrest 124. First force dissipater 21 is coupled to an inner wall of a first side-wing panel 131 included in headrest 126. Second force dissipater 22 is coupled to an inner wall of a second side-wing panel 132 included in headrest 126.

During a collision or other incident, application of an external impact force 20 to juvenile vehicle seat 110 causes juvenile vehicle seat 110 to move in the direction of impact force 20 (not shown) relative to an occupant. Such movement causes occupant to move toward and engage with or impact first force dissipater 21. This impact causes energy to be transferred from the impacting object (such as the occupant's shoulders and head) to first force dissipater 21 as suggested in FIG. 18.

First force dissipater 21 absorbs that transferred energy to minimize the magnitude of a resulting force applied to a child seated in juvenile vehicle seat 110 during the collision.

First force dissipater 21 functions to minimize the g-loads (acceleration) experienced by the child seated on seat bottom 112 of juvenile vehicle seat 110 during exposure of seat 110 to external impact force 20 as suggested in FIG. 18. First force dissipater 21 also functions to maximize the time interval (i.e., ride-down time) between the moment the impacting object strikes first force dissipater 21 to apply the external impact force and the moment that resulting force reaches zero.

First force dissipater 21 and second force dissipater 22 of juvenile vehicle seat 110 are substantially similar in size, shape, and pattern to the first and second force dissipaters 21 and 22 as described for juvenile vehicle seat 10.

The invention claimed is:

1. A child restraint comprising
a juvenile vehicle seat including a seat bottom and a seat back coupled to the seat bottom and arranged to extend upwardly away from the seat bottom and
an energy-dissipation system including a pad foundation coupled to the seat back and a ride-down pad having a lower concave surface and an upper convex surface coupled to the pad foundation to locate the pad foundation between the seat back and the ride-down pad, the ride-down pad being configured to provide means for controlling movement of an occupant sitting on the juvenile vehicle seat during application of an impact force to a side of the juvenile vehicle seat to cause a shoulder of the occupant to impact the lower concave surface of the ride-down pad to cause the ride-down pad to deform at a predetermined rate so that a first portion of impact energy associated with the impact force is absorbed and then to cause a head of the occupant to impact the upper convex surface of the ride-down pad to cause the ride-down pad to deform at the predetermined rate so that a second portion of impact energy associated with the impact force is absorbed and g-loads experienced by the occupant seated in the juvenile vehicle seat are minimized.

2. The child restraint of claim 1, wherein the ride-down pad includes a front surface and a back surface and the front surface is adapted to be impacted by the occupant during application of the impact force.

3. The child restraint of claim 2, wherein the back surface is coupled to the pad foundation.

4. The child restraint of claim 1, wherein the concave surface and the convex surface meet at a point that is tangential to both the concave and the convex surface.

5. The child restraint of claim 4, wherein the point is about midway between a top end of the ride-down pad and an opposite bottom end of the ride-down pad.

6. The child restraint of claim 4, wherein the ride-down pad includes a front surface and a back surface, the front surface is adapted to be impacted by the occupant during application of the impact force, the ride-down pad further includes a top end positioned to lie in spaced-apart relation above the seat bottom and a bottom end positioned to lie between the top end and the seat bottom, and the ride-down pad has a top thickness defined between the front surface and the back surface at the top end of the ride-down pad and a bottom thickness defined between the front surface and the back surface at the bottom end of the ride-down pad.

7. The child restraint of claim 1, wherein the ride-down pad includes a top portion adapted to be impacted by the head of the occupant and a bottom portion adapted to be impacted by the shoulder of the occupant.

8. The child restraint of claim 7, wherein the top portion includes a front face that is convex and the bottom portion includes a front face that is concave.

9. The child restraint of claim 1, wherein the seat back includes a backrest and a headrest, the backrest is arranged to interconnect the headrest and seat bottom and the energy-dissipation system is coupled to the headrest.

10. The child restraint of claim 9, wherein the headrest includes a rear panel coupled to the backrest to extend upwardly away from the backrest, a first side-wing panel coupled to the rear panel to extend outwardly away from the rear panel above the seat bottom, and a second side-wing panel coupled to the rear panel in spaced-apart relation to the first side-wing panel to extend outwardly away from the rear panel above the seat bottom, and the energy-dissipation system is coupled to the first side-wing panel to lie between the first and second side-wing panels.

11. The child restraint of claim 9, wherein the headrest is coupled to the backrest to move up and down relative to the backrest.

12. A child restraint comprising
a juvenile vehicle seat including a seat bottom and a seat back extending upwardly from the seat bottom, the seat back including a headrest and a backrest extending between the seat bottom and the headrest, the headrest including a first side-wing panel and a second side-wing panel arranged to lie in spaced apart relation to the first side-wing panel and to define an occupant-receiving space therebetween, and
an energy-dissipation system coupled to the headrest and arranged to absorb side impact forces, the energy-dissipation system including first and second force dissipaters, the first force dissipater including a first pad foundation coupled to the first side-wing panel and a first ride-down pad coupled to the first pad foundation, the second force dissipater including a second pad foundation coupled to the second side-wing panel and a second ride-down pad coupled to the second pad foundation, and the first and second force dissipaters are arranged to extend into the occupant-receiving space toward one another and each ride-down pad has a convex upper surface and a concave lower surface arranged to provide means for causing a child's shoulder to first impact the first force dissipater before the child's head impacts the first force dissipater.

13. A child restraint comprising
a juvenile vehicle seat including a seat bottom and a seat back coupled to the seat bottom and arranged to extend upwardly away from the seat bottom and
an energy-dissipation system including a pad foundation coupled to the seat back and a ride-down pad coupled to the pad foundation to locate the pad foundation between the seat back and the ride-down pad, the ride-down pad having a lower concave surface and an upper convex surface and being configured to provide means for controlling movement of an occupant sitting on the juvenile vehicle seat during application of an impact force to a side of the juvenile vehicle seat to first cause a shoulder of the occupant to impact the ride-down pad to cause the ride-down pad to deform at a predetermined rate so that a first portion of impact energy associated with the impact force is absorbed and to second cause a head of the occupant to impact the ride-down pad to cause the ride-down pad to deform at the predetermined rate so that a second portion of impact energy associated with the impact force is absorbed and g-loads experienced by the occupant seated in the juvenile vehicle seat are minimized.

14. The child restraint of claim 1, wherein the ride-down pad includes a front surface, a back surface, a top surface and a bottom surface, the front surface being a first distance from the back surface at the top surface and the front surface being a second distance from the back surface at the bottom surface, the first distance being greater than the second distance.

15. The child restraint of claim 12, wherein the first and second force dissipaters are arranged to cause the child's other shoulder to first impact the second force dissipater before the child's head impacts the second force dissipater.

* * * * *